March 29, 1955  E. L. HARRIS  2,704,943
CONVEYER CHAIN
Filed Oct. 10, 1952
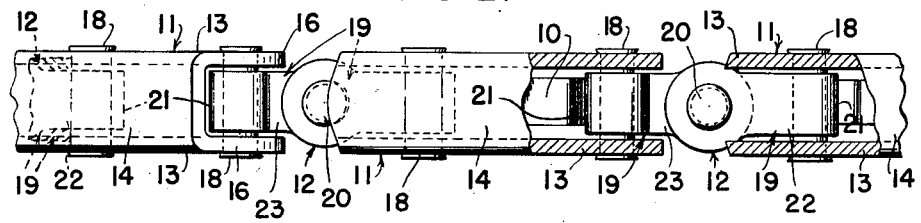
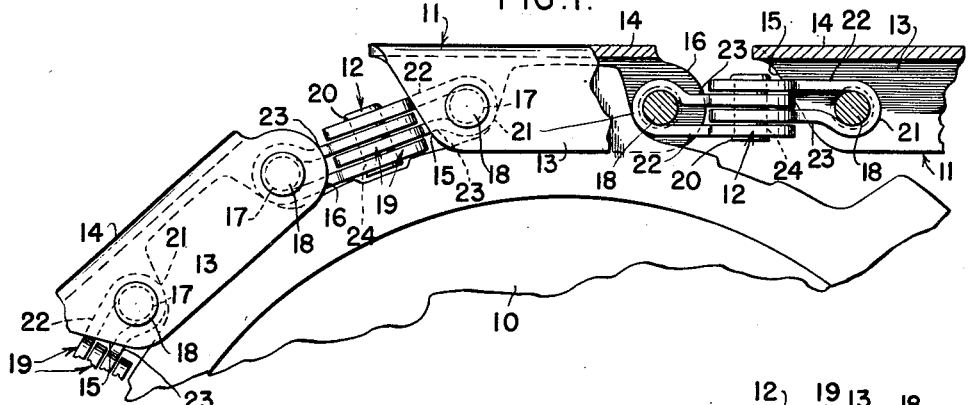
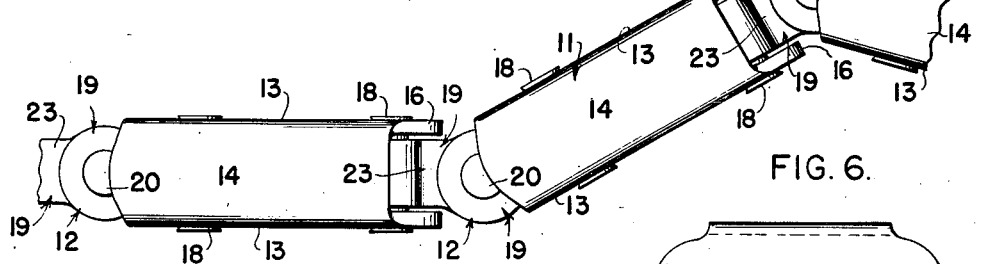
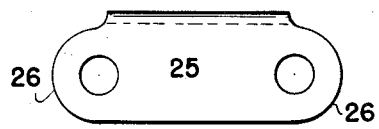
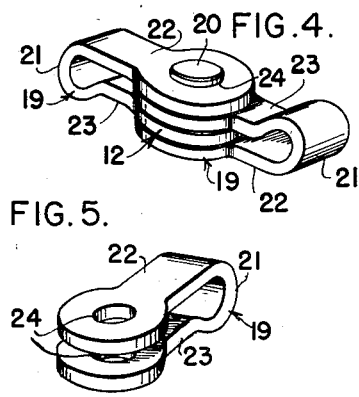
INVENTOR.
EDGAR L. HARRIS
BY Adrian L. Bateman, Jr.
ATTORNEY

United States Patent Office 2,704,943
Patented Mar. 29, 1955

2,704,943
CONVEYER CHAIN

Edgar L. Harris, Milwaukee, Wis., assignor to Chain Belt Company, Milwaukee, Wis., a corporation of Wisconsin Application October 10, 1952, Serial No. 314,088

5 Claims. (Cl. 74—246)

This invention relates to conveyer chains generally, and more particularly to that class of chains which flex in more than one direction.

Chains of the type which may be flexed in more than one direction or plane, which are commonly called "snake" or "multi-flex" chains, are quite frequently used for conveying purposes. These chains may be provided with a plate-like top upon which articles may be placed for conveyance or they may be provided with hooks or other attachments from which objects may be suspended as the chain moves around its orbit on a trolley structure.

Multi-flex chains generally comprise a rigid or block link pivotally connected by swivel links, with the axes of the pivot and swivel pins being displaced at right angles so that the chain may flex in either a horizontal or vertical plane, or in any two planes disposed at right angles to one another. One such chain is illustrated in U. S. Patent No. 1,964,997 to F. P. Perkins. The chain disclosed in the aforesaid Perkins patent utilizes a rigid link and a swivel link, the mating parts of the swivel link being joined in a male and female relationship. This type of joint has certain inherent disadvantages which the present invention overcomes. One of these disadvantages is that the male and female joint places the swivel pin in sheer in only two planes, these planes being parallel to and adjacent the mating faces of the swivel joint. It is one of the objects of this invention to distribute the sheer stresses on the swivel pin into three planes, thus increasing the sheer strength of the swivel joint by 50 per cent.

Another disadvantage of the male and female joint is that the male portion of the connection exerts all of its force along the center portion of the swivel pin, while the female portions of the joint grip the pin at its upper and lower ends. As the chain wears, there is a tendency for the pin to bend in the direction of the pull imposed upon it by the male portion of the swivel joint. Accordingly it is another object of this invention to distribute the bending forces along the swivel pin so that these forces may more nearly counteract one another with the result that the tendency toward pin bending is greatly reduced.

Another disadvantage of the male and female type of swivel connection is that it requires two distinct mating parts, which results in a high cost of fabrication and increased expense in assembling the chain. Accordingly, it is a still further object of this invention to provide a swivel joint, the mating parts of which are identical, thereby reducing the cost of fabrication and assembly.

According to this invention the chain is composed of alternate U-shaped or saddle links and clevice or swivel links, the clevice links being joined to the saddle links by means of transverse pintle pins whereby the saddle and clevice links may pivot with respect to each other. Each clevice link is swivelled at its mid portion, the axis of the swivel being perpendicular to the axes of the aforesaid pintle pins whereby the chain may flex in a plane perpendicular to the plane of flexure permitted by the pintle pins. The clevice or swivel joint comprises two identical clevice members which are joined together by a swivel pin, with the extending arms of the clevices interleaved or laminated in an alternate relationship.

Other advantages and details of the invention will be apparent from the following description and from the drawings wherein:

Fig. 1 is an elevation view of a chain constructed in accordance with this invention, shown meshing with a sprocket and with parts broken away to illustrate details, Fig. 2 is a plan view of the chain illustrated in Fig. 1, Fig. 3 is another plan view of the chain shown in Fig. 1 and illustrates the swivelling of the chain in the clevice joint, Fig. 4 is a perspective view showing the details of the clevice link illustrated in Figs. 1 and 2, Fig. 5 is a perspective view of one of the identical clevice members making up the clevice link, Fig. 6 shows a modified form of the saddle link illustrated in Figs. 1 and 2 in which the ends of the saddle link are symmetrical to permit greater reflexing of the chain, and Fig. 7 is an enlarged sectional view of the clevice link with the arms of the clevice members spread apart along the swivel pin in order to illustrate the sheer planes across the pin.

Referring to the details of the drawings, Fig. 1 illustrates the chain of this invention flexing around a sprocket 10. The chain may be seen to comprise saddle or U-shaped pintle links 11 connected by clevice or swivel links 12. The saddle link is preferably formed from sheet metal and has depending side plate portions 13 joined by a flat top portion 14. The flat top portion may form a carrying surface or it may have flat plates, such as the well known crescent type of attachment, bolted or welded to it in order to provide it with a larger carrying capacity. It may be seen that the saddle link 11 shown in Fig. 1 is non-symmetrical in that its forward end 15 is tapered upwardly toward the flat top portion 14 while the rearward end 16 is rounded off. This non-symmetrical link provides a flat top portion 14 having a greater area than would have resulted if both ends of the link were rounded off as is the rearward end 16, thus providing a greater area for the attachment of the plates previously referred to.

The depending side plate portions 13 are pierced at 17 to admit a pintle pin 18 by means of which the clevice link 12 is joined to the saddle link.

The clevice link 12 (see Fig. 4) comprises two identical clevice members 19 joined medially of the clevice link by a swivel pin 20, the axis of which is at right angles to the axes of the pintle pins 18.

It should be noted (see Fig. 5) that the clevice members comprise unitary pieces fabricated from sheet metal of uniform thickness. One end of each clevice member is closed by an enlarged rounded or barrel portion 21, this portion forming a bearing for receiving the pintle pin 18. One of the arms 22 of the clevice member is tangent to the rounded portion 21 while the other arm 23 intersects the rounded portion at a point substantially 270° from that point of tangency. The arms 22 and 23 extend in spaced, parallel relationship, the distance between the arms being substantially equal to the thickness of the arms.

The other end of the clevice member is left open and is pierced by registering holes 24 through which the swivel pin 20 is inserted for completing the swivel joint. Fig. 4 illustrates clearly the manner in which the clevice members 19 are joined by the swivel pin 20 and it may be seen that the arms 22 and 23 of the clevice members are interleaved or laminated in an alternate relationship along the swivel pin. That is, starting at the bottom and continuing upwardly along the swivel pin 20, one arm of one clevice member is mated with one arm of the other clevice member, etc. This interleaving results in the creation of three sheer planes across the swivel pin 20 as illustrated by the planes A, B and C of Fig. 7. For a given stress in the chain, the sheer stress in the pin is split into three components instead of two as is the case in a male and female swivel joint. Further, Fig. 7 illustrates clearly that the swivel pin 20 is alternately subjected to stresses in opposite directions separated only by the thickness of the arms of the clevice members 19, whereas in a male and female swivel the male member must generally have twice the thickness of the arms of the female member and the pull exerted upon the pin is concentrated along the medial portion of the pin by the male member while the upper and lower ends of the pin are restrained by the two arms of the female member.

As was previously pointed out, the outer surface of one arm 22 of the clevice member is tangent to the outer surface of the barrel portion 21, the inner surface of that arm being tangent to the pintle pin 18, while the other arm 23 intersects the barrel portion substantially 270° from this point of tangency. This construction causes the inner face of the arm 23 to lie in a plane which passes through the axis of the barrel portion 21, which is also the axis of the pintle pin 18 when the chain is assembled. When the clevice members 19 are joined by the swivel pin 20, the arms of the clevice members are reversed (see Fig. 4), that is, the arm 22 of one clevice is uppermost while the arm 23 of its mating clevice is uppermost. As may best be seen in Fig. 7, this assembly results in the mating of the faces of the clevices which lie in the plane of the axis of the barrelled portions 21 at the center of the swivel joint, with the result that the axes of the pintle pins lie in a single plane passing through the center of the swivel joint. This construction balances the stresses applied to the swivel pin.

Fig. 6 illustrates a modified form of saddle or pintle link 25 in which both ends 26 of the link are rounded in a manner similar to the rounded end 16 of the saddle link 11 of Figs. 1 and 2. The modified saddle 25 of Fig. 6 permits greater reflexing or bending of the chain in a direction opposite to that shown in Fig. 1. The modified saddle link 25 will be found to be preferable in an application where the chain is required to flex in both directions as well as swivel in the clevice joint.

The saddle type pintle links illustrated may be replaced by other types of pintle links well known in the art.

From the foregoing description it is apparent that the clevice link of this invention provides distinct advantages over the prior male and female links in that it provides a stronger joint for given sized members, and further it provides a joint or a link that has improved wearing qualities because the stress and wear due to flexing of the swivel are better distributed along the swivel pin. Further, the construction of this invention provides the distinct advantage of eliminating one of the parts required in constructing a male and female clevice link, because in this invention both of these parts preferably are identical, thereby reducing tooling expense and assembling expense.

One embodiment of the invention has been illustrated for purposes of disclosure and it is to be understood that variations in the disclosed embodiment are contemplated and will be apparent to those skilled in the art. Accordingly, it is intended that the invention be limited only by the scope of the following claims.

I claim:
1. A muli-flex chain comprising alternate saddle and swivel links, said saddle links comprising U-shaped saddle members of sheet metal each having side bar portions and a substantially flat top portion, the swivel links each comprising a pair of identical sheet metal clevice members each having a pair of arms extending in spaced parallel relationship, the space between arms being substantially equal to the thickness of each of the arms, a swivel pin joining the clevice members with the arms of the clevice members arranged to interfit in an alternate, laminated relationship whereby the sheer stresses in the swivel pin are distributed over three planes perpendicular to the axis of the pin.

2. A swivel link for multi-flex chains comprising a pair of clevice members each having a pair of arms of the same thickness extending in parallel relationship and spaced apart a distance slightly greater than the thickness of each of the arms, said arms being connected by a closed end having a rounded portion providing a bearing surface for a pintle pin; a swivel pin joining the clevice members adjacent their open ends with the arms of the clevice members interfitted in alternate laminated relationship along the pin.

3. A multi-flex chain comprising alternate pintle and swivel links, each of said pintle links comprising a rigid member provided with pintle pins adjacent its ends; each of said swivel links comprising two identical clevice members each having a closed end and an open end, the closed ends of the clevice members being adapted to receive pintle pins for joining the clevice members to the pintle links, and a swivel pin arranged with its axis normal to the axis of the pintle pins and joining the clevice members adjacent their open ends.

4. A multi-flex chain comprising alternate pintle and swivel links, each of said pintle links comprising a rigid member provided with pintle pins adjacent its ends; said swivel link comprising two identical clevice members each having a closed end and an open end, the closed ends of the clevice members being adapted to receive pintle pins for joining the clevice members to the pintle links, and a swivel pin arranged with its axis normal to the axis of the pintle pins and joining the open ends of the clevice members with their arms arranged in alternate, laminated relationship along the axis of the swivel pin.

5. A multi-flex chain comprising alternate pintle and swivel links, said swivel link comprising a pair of clevices each having a closed end portion enclosing a pintle pin and an open end defined by a pair of parallel arms of the same thickness spaced apart a distance substantially equal to the thickness of each of the arms, the first of said arms having its inner face in a plane tangent to the pintle pin and the second arm having its inner face lying in the plane of the axis of the pintle pin, a swivel pin joining the pair of clevices with the arms of the clevices arranged to have the inner faces of the second arms mated whereby the axes of the pintle pins lie in a plane passing through the center of the swivel joint and the forces applied to the swivel pin are balanced.

References Cited in the file of this patent
UNITED STATES PATENTS

| | | |
|---|---|---|
| 1,036,734 | Sessions | Aug. 27, 1912 |
| 1,351,825 | Zubal | Sept. 7, 1920 |
| 1,372,689 | Helwig | Mar. 29, 1921 |
| 1,725,467 | Marble | Aug. 20, 1929 |
| 1,964,997 | Perkins | July 3, 1934 |
| 2,529,858 | Young | Nov. 14, 1950 |
| 2,602,345 | Braumiller | July 8, 1952 |